United States Patent
Suzuki

(10) Patent No.: US 12,223,341 B2
(45) Date of Patent: Feb. 11, 2025

(54) NON-TRANSITORY COMPUTER-READABLE STORAGE MEDIUM, INFORMATION PROCESSING APPARATUS, AND INFORMATION PROCESSING METHOD

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 401 days.

(21) Appl. No.: 17/550,344

(22) Filed: Dec. 14, 2021

(65) Prior Publication Data

US 2022/0300317 A1    Sep. 22, 2022

(30) Foreign Application Priority Data

Mar. 22, 2021   (JP) .................................. 2021-047631

(51) Int. Cl.
*G06F 9/50*    (2006.01)
*G06F 9/46*    (2006.01)

(52) U.S. Cl.
CPC ...................... *G06F 9/46* (2013.01)

(58) Field of Classification Search
CPC ............................. G06F 9/5038; G06F 9/5066
See application file for complete search history.

(56) References Cited

U.S. PATENT DOCUMENTS

| | | | |
|---|---|---|---|
| 2004/0019676 A1 | 1/2004 | Iwatsuki et al. | |
| 2015/0378803 A1 | 12/2015 | Otsuka et al. | |
| 2017/0277769 A1* | 9/2017 | Pasupathy | H04L 41/22 |
| 2019/0129781 A1 | 5/2019 | Uchiumi et al. | |
| 2022/0197949 A1* | 6/2022 | Kim | G06F 16/9024 |

FOREIGN PATENT DOCUMENTS

| | | |
|---|---|---|
| JP | 2004-056604 A | 2/2004 |
| JP | 2010-146306 A | 7/2010 |
| JP | 2016-012193 A | 1/2016 |
| JP | 2019-082944 A | 5/2019 |

OTHER PUBLICATIONS

European Search Report from the European Patent Office in counterpart European Application No. 21213061.1, dated May 12, 2022.
Communication pursuant to Article 94(3) EPC from the European Patent Office in counterpart European Application No. 21213061.1, dated Jan. 2, 2024.
Office Action of Japanese Patent Application No. 2021-047631, dated Aug. 27, 2024, with English Machine Translation.
Office Action of European Application No. 21213061.1, dated Dec. 17, 2024.

* cited by examiner

*Primary Examiner* — Andy Ho
(74) *Attorney, Agent, or Firm* — ArentFox Schiff LLP

(57) ABSTRACT

A non-transitory computer-readable recording medium storing a program that causes executed by a processor included in a computer that presents a directed graph representing a dependency relationship between a plurality of nodes to execute a process. The process includes recording an added generation or a deleted generation at the time of configuration change in property information in the directed graph, selecting, among the plurality of nodes, nodes that exist at designated time and an edge between the nodes, and presenting the directed graph by acquiring configuration information of the nodes and the edge at the designated time.

5 Claims, 19 Drawing Sheets

FIG. 10

TENANT CONFIGURATION INFORMATION

DEFINITION EXAMPLE

| PROPERTY NAME | TenantId | TENANT NAME | ADDED GENERATION | DELETED GENERATION |
|---|---|---|---|---|
| TYPE | String | String | Time | Time |

↶ F1

DATA EXAMPLE

| TenantId | TENANT NAME | ADDED GENERATION | DELETED GENERATION |
|---|---|---|---|
| 01 | TenantA | T1 | - |

VM CONFIGURATION INFORMATION

DEFINITION EXAMPLE ~G1

| PROPERTY NAME | VmId | VM NAME | STATE | PORT | ADDED GENERATION | DELETED GENERATION |
|---|---|---|---|---|---|---|
| TYPE | String | String | String | String | Time | Time |

DATA EXAMPLE ~G2

| VmId | VM NAME | STATE | PORT | ADDED GENERATION | DELETED GENERATION |
|---|---|---|---|---|---|
| 01 | VM01 | active | port1 | T1 | - |
| 02 | VM02 | active | port2 | T1 | - |
| 03 | VM03 | active | port2 | T3 | T5 |

FIG. 12

VOLUME CONFIGURATION INFORMATION

DEFINITION EXAMPLE  ~H1

| PROPERTY NAME | VolumeId | VOLUME NAME | STATE | ADDED GENERATION | DELETED GENERATION |
|---|---|---|---|---|---|
| TYPE | String | String | String | Time | Time |

DATA EXAMPLE  ~H2

| VolumeId | VOLUME NAME | STATE | ADDED GENERATION | DELETED GENERATION |
|---|---|---|---|---|
| 01 | Vol01 | active | T1 | - |
| 02 | Vol02 | active | T1 | - |
| 03 | Vol03 | active | T3 | T5 |

FIG. 13

STORAGE CONFIGURATION INFORMATION

DEFINITION EXAMPLE

| PROPERTY NAME | StorageNodeId | STORAGE NODE NAME | STATE | ADDED GENERATION | DELETED GENERATION |
|---|---|---|---|---|---|
| TYPE | String | String | String | Time | Time |

~I1

DATA EXAMPLE

| StorageNodeId | STORAGE NAME | STATE | ADDED GENERATION | DELETED GENERATION |
|---|---|---|---|---|
| 01 | St001 | online | T1 | - |
| 02 | St002 | online | T1 | - |
| 03 | St003 | online | T3 | T5 |

SERVER CONFIGURATION INFORMATION

DEFINITION EXAMPLE

| PROPERTY NAME | ServerId | SERVER NAME | STATE | ADDED GENERATION | DELETED GENERATION |
|---|---|---|---|---|---|
| TYPE | String | String | String | Time | Time |

~J1

DATA EXAMPLE

| ServerId | SERVER NAME | STATE | ADDED GENERATION | DELETED GENERATION |
|---|---|---|---|---|
| 01 | Server001 | active | T1 | - |
| 02 | Server002 | active | T1 | - |

PHYSICAL SWITCH CONFIGURATION INFORMATION

DEFINITION EXAMPLE ~K1

| PROPERTY NAME | PSwitchId | PHYSICAL SWITCH NAME | ADDED GENERATION | DELETED GENERATION |
|---|---|---|---|---|
| TYPE | String | String | Time | Time |

DATA EXAMPLE ~K2

| TenantId | PHYSICAL SWITCH NAME | ADDED GENERATION | DELETED GENERATION |
|---|---|---|---|
| 01 | psw001 | T1 | - |
| 02 | psw002 | T1 | - |

FIG. 16

EDGE CONFIGURATION INFORMATION

DEFINITION EXAMPLE ~L1

| PROPERTY NAME | EdgeId | Type | Src | Dst | ADDED GENERATION | DELETED GENERATION |
|---|---|---|---|---|---|---|
| TYPE | String | String | String | String | Time | Time |

DATA EXAMPLE ~L2

| EdgeId | Type | Src | Dst | ADDED GENERATION | DELETED GENERATION |
|---|---|---|---|---|---|
| 01 | OwnedBy | VM01 | TenantA | T1 | - |
| 02 | OwnedBy | VM02 | TenantA | T1 | - |
| 03 | ConsistsOf | VM01 | Vol01 | T1 | - |
| 04 | ConsistsOf | VM02 | Vol02 | T1 | - |
| 05 | HostedOn | VM01 | Server001 | T1 | - |
| 06 | HostedOn | VM02 | Server002 | T1 | - |
| 07 | AllocatedOn | VM01 | St001 | T1 | - |
| 08 | AllocatedOn | VM02 | St002 | T1 | - |
| 09 | ConnectedTo | St001 | Psw001 | T1 | - |
| 10 | ConnectedTo | St002 | Psw001 | T1 | - |
| 11 | ConnectedTo | Server001 | Psw002 | T1 | - |
| 12 | OwnedBy | VM03 | TenantA | T3 | T5 |
| 13 | ConsistsOf | VM03 | Vol03 | T3 | T5 |
| 14 | HostedOn | VM03 | Server002 | T3 | T5 |
| 15 | AllocatedOn | VM03 | St003 | T3 | T5 |
| 16 | ConnectedTo | St003 | Psw001 | T3 | T5 |
| 17 | ConnectedTo | Server002 | Psw002 | T3 | T5 |

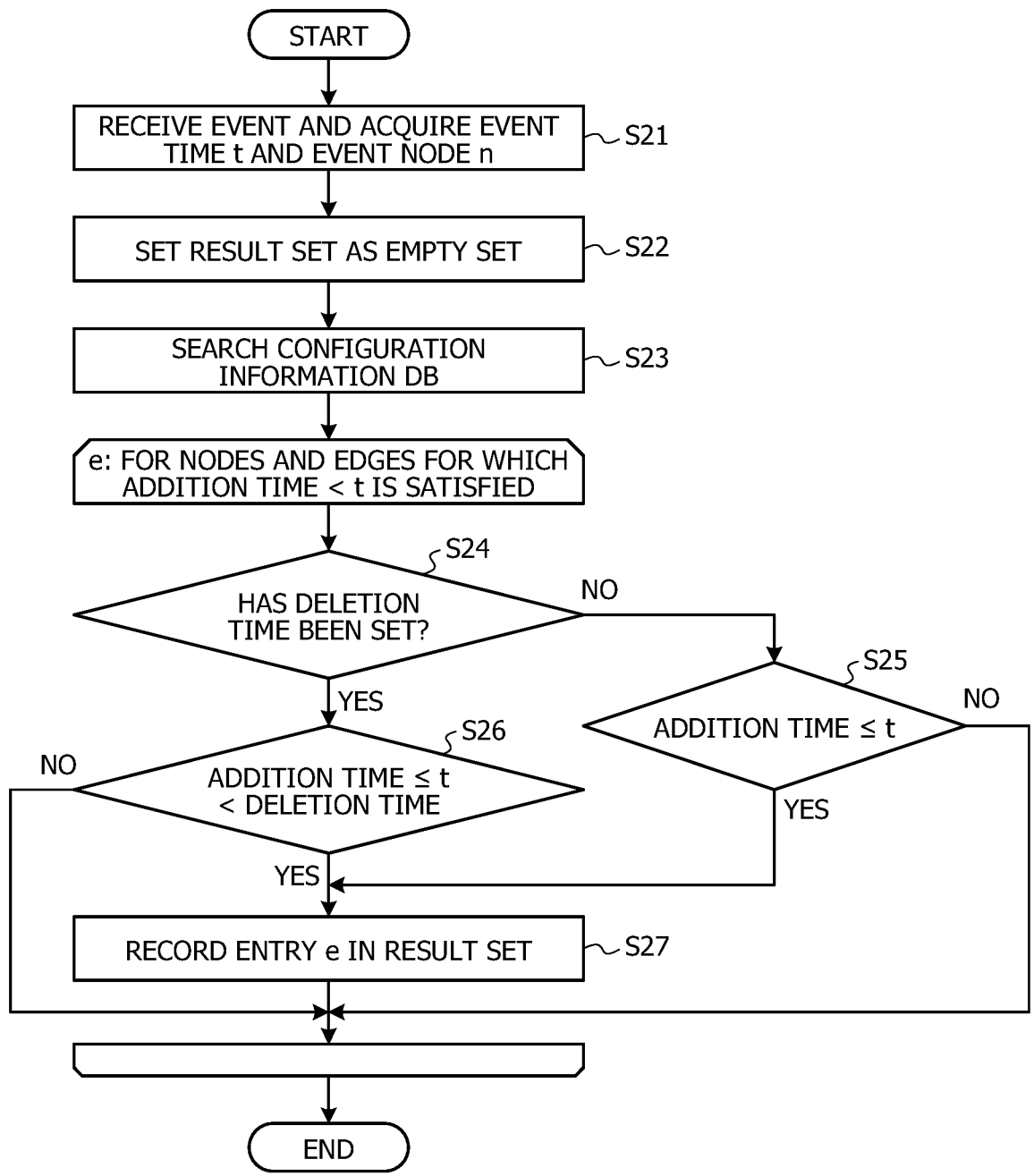

NON-TRANSITORY COMPUTER-READABLE STORAGE MEDIUM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2021-47631, filed on Mar. 22, 2021, the entire contents of which are incorporated herein by reference.

FIELD

The embodiment discussed herein is related to a non-transitory computer-readable storage medium, an information processing apparatus, and an information processing method.

BACKGROUND

In a cloud environment in which a customer system operates, only a configuration related to a tenant of a specific customer operator among various configurations in the cloud environment may be visualized.

A cloud infrastructure may become complicated because a management infrastructure differs depending on virtual resources or physical sources.

In the cloud infrastructure, virtual resources such as a virtual machine (VM), a virtual network, and a virtual volume are property of a customer and thus may be easily identified. On the other hand, since a physical server, a storage, a physical switch, and the like are shared by a plurality of customers, it may be difficult to determine to what extent they are related to each customer.

Accordingly, by performing an investigation while checking logs of a plurality of virtual and physical layers and visualizing past performance information in addition to accumulated past configuration information in a linked manner, it is possible to perform a rapid investigation. For example, a method of linking the past performance information may be realized by determining a failure event such as a fault, access concentration, and latency from the performance information and causing a corresponding node to be displayed in a highlighted manner.

Here, in a case where configuration information changes due to addition of a node in the cloud infrastructure at a certain time, since there is no corresponding node at the time before the time at which the node is added, it is impossible to display an event.

Accordingly, the acquired configuration information of all the generations may be stored in a graph database (DB).

Japanese Laid-open Patent Publication Nos. 2016-012193 and 2019-082944 are disclosed as related art.

SUMMARY

According to an aspect of the embodiments, a non-transitory computer-readable recording medium storing a program that causes executed by a processor included in a computer that presents a directed graph representing a dependency relationship between a plurality of nodes to execute a process, the process includes recording an added generation or a deleted generation at the time of configuration change in property information in the directed graph; selecting, among the plurality of nodes, nodes that exist at designated time and an edge between the nodes; and presenting the directed graph by acquiring configuration information of the nodes and the edge at the designated time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a table exemplifying tenant configuration information in a configuration information DB illustrated in FIG. 9;

FIG. 11 is a table exemplifying VM configuration information in the configuration information DB illustrated in FIG. 9;

FIG. 12 is a table exemplifying volume configuration information in the configuration information DB illustrated in FIG. 9;

FIG. 13 is a table exemplifying storage configuration information in the configuration information DB illustrated in FIG. 9;

FIG. 14 is a table exemplifying server configuration information in the configuration information DB illustrated in FIG. 9;

FIG. 15 is a table exemplifying physical switch configuration information in the configuration information DB illustrated in FIG. 9;

FIG. 16 is a table exemplifying edge configuration information in the configuration information DB illustrated in FIG. 9;

FIG. 19 is a flowchart describing configuration information reconstruction processing in the physical machine illustrated in FIG. 8.

DESCRIPTION OF EMBODIMENTS

Figure 1:
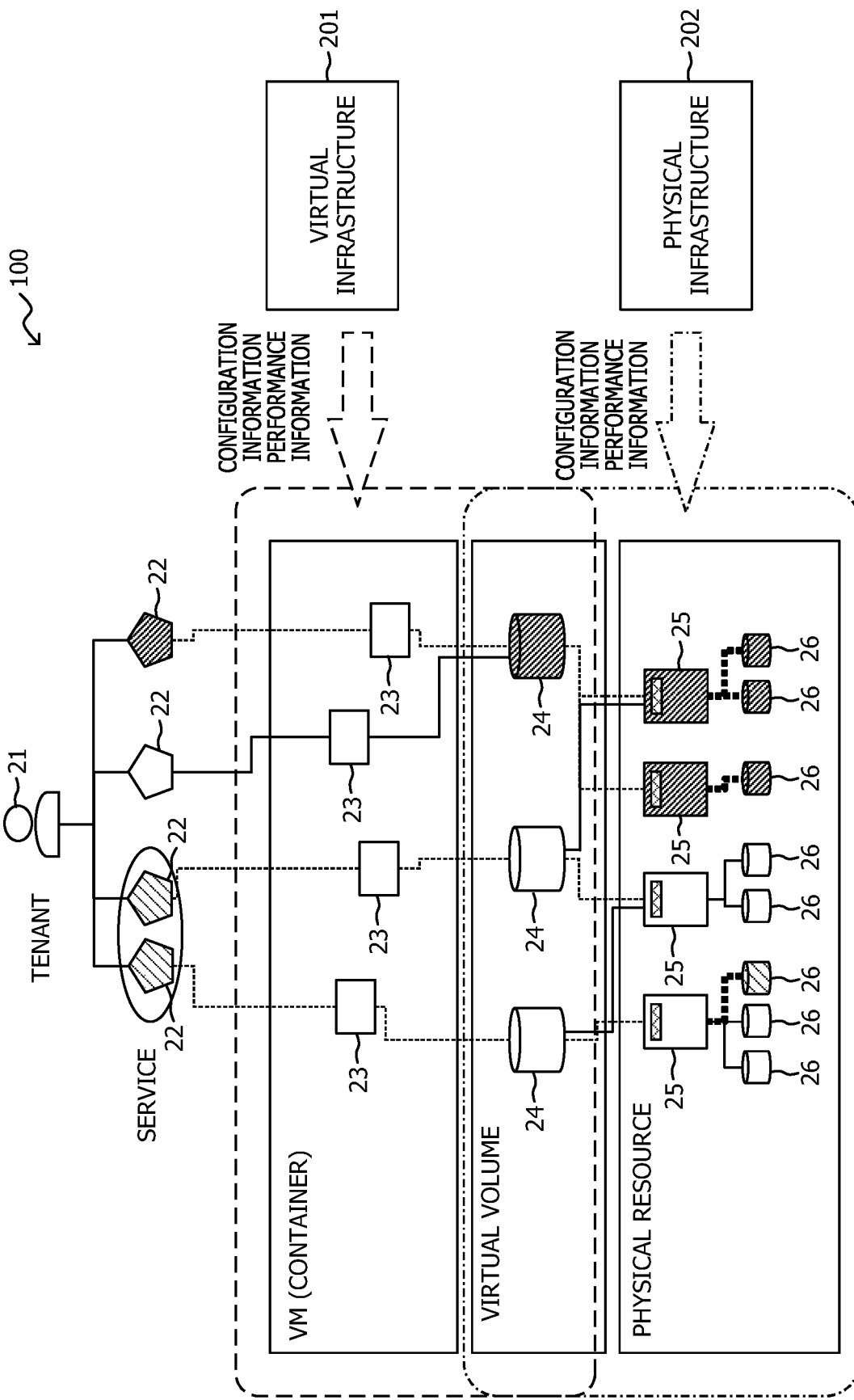
FIG. 1 is a block diagram schematically illustrating a configuration example of a customer system in an embodiment.

However, since nodes to be event targets are searched for from configuration information of a plurality of generations in a graph DB and are combined, the computation cost for searching for the nodes in the graph DB may increase. Accordingly, as a search space becomes larger, a search time becomes longer.

According to one aspect, it is an object to shorten a time for searching for configuration information of a cloud infrastructure and update the configuration information in a short cycle.

[A] Embodiment

An embodiment will be described below with reference to the drawings. However, the embodiment described below is merely illustrative and is not intended to exclude employment of various modification examples or techniques that are not explicitly described in the embodiment. For example, the present embodiment may be implemented by variously modifying the embodiment without departing from the gist of the embodiment. Each of the drawings is not intended to indicate that only the elements illustrated in the drawing are included. Thus, other functions or the like may be included.

Each of the same reference signs denotes substantially the same portion in the drawings, so that the description thereof is omitted below.

[A-1] Configuration Example

FIG. 1 is a block diagram schematically illustrating a configuration example of a customer system 100 in an embodiment.

The customer system 100 includes a tenant 21, services 22, VMs 23, virtual volumes 24, servers 25, and storages 26. The VM 23 may be a container. The server 25 and the storage 26 may be collectively referred to as a physical resource. The VM 23, the virtual volume 24, the server 25, and the storage 26 may be collectively referred to as nodes.

The VM 23 and the virtual volume 24 are deployed over a virtual infrastructure 201 and managed by configuration information and performance information. The virtual volume 24, the server 25, and the storage 26 are deployed over a physical infrastructure 202 and managed by configuration information and performance information.

The configuration information includes data on an added generation and a deleted generation in addition to a name, a state, or the like of each node. The performance information includes data on the performance of each node. The details of the configuration information will be described later by using FIGS. 2 and 10 to 16, and the like.

Figure 2:
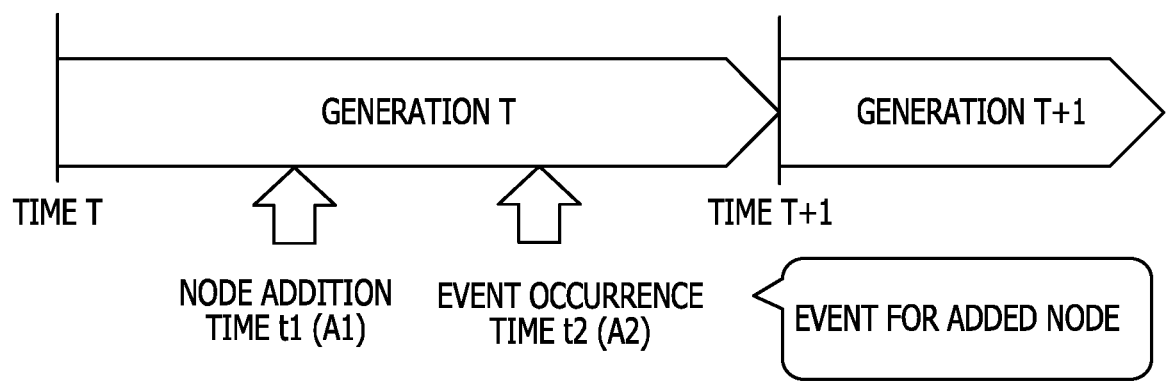
FIG. 2 is a diagram describing configuration information in the customer system illustrated in FIG. 1.

FIG. 2 is a diagram describing configuration information in the customer system 100 illustrated in FIG. 1.

The configuration information is stored in a graph DB as a directed graph in order to represent a dependency relationship between nodes. The acquisition timing differs between the configuration information and the performance information, and the acquisition time is irregular. Generally, since a change in performance occurs more frequently than a change in configuration, an acquisition cycle of the performance information may be shorter than that of the configuration information.

The generation of the graph DB is managed by the acquired time. An example illustrated in FIG. 2 indicates a generation T acquired at time T and a generation T+1 acquired at time T+1. As indicated by reference sign A1, a node is added at time t1 of the generation T, and as indicated by reference sign A2, an event for the added node occurs at time t2 of the generation T.

Any generation may be asynchronously deleted.

Figure 3:
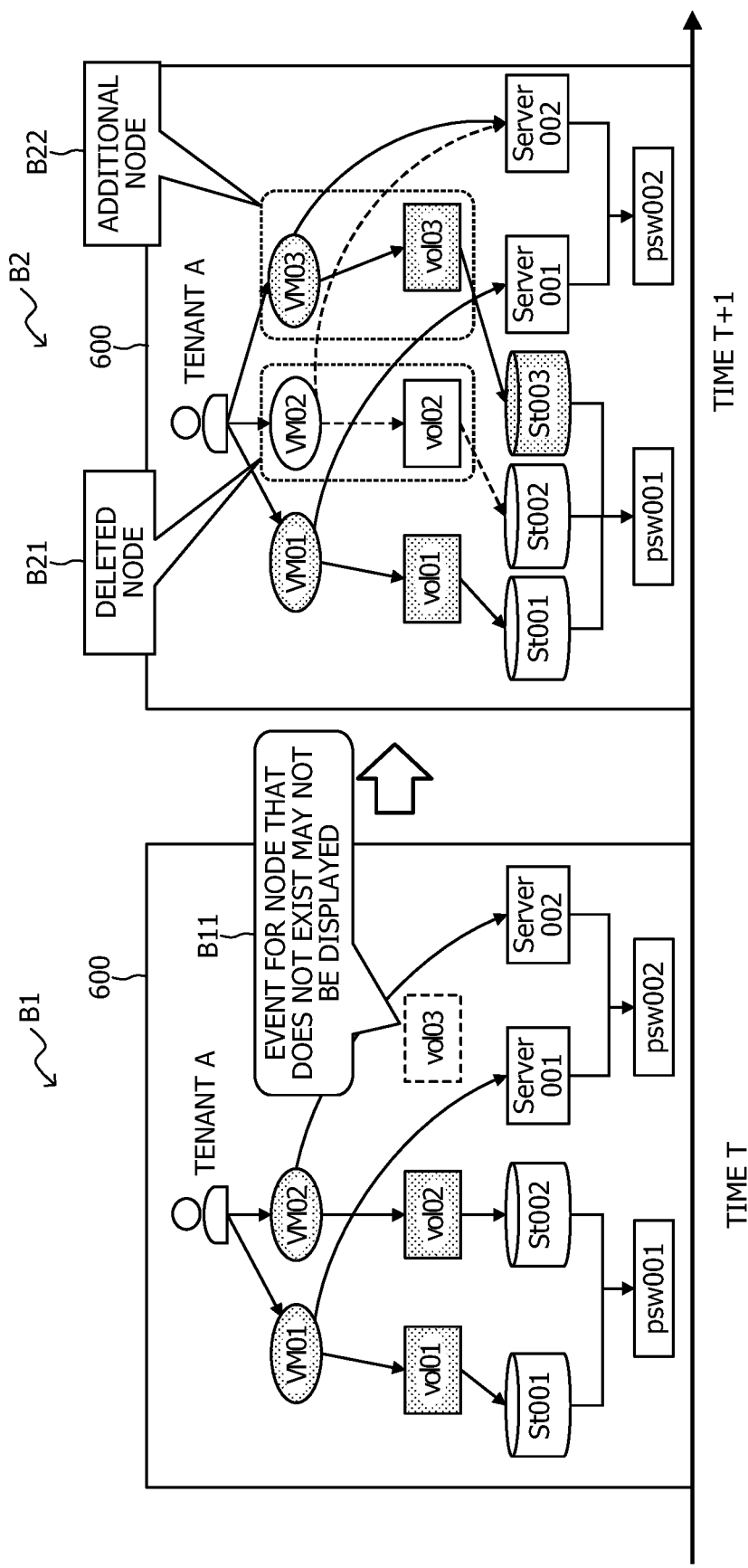
FIG. 3 is a diagram describing an example of deleting and adding a node in a related example.

FIG. 3 is a diagram describing an example of deleting and adding a node in a related example.

A customer system 600 illustrated in FIG. 3 corresponds to the customer system 100 in the embodiment illustrated in FIG. 1. At time T indicated by reference sign B1, the customer system 600 includes a tenant A, VM01, VM02, vol01, vol02, Server001, Server002, St001, St002, psw001, and psw002.

VM corresponds to the VM 23 illustrated in FIG. 1, vol corresponds to the virtual volume 24 illustrated in FIG. 1, Server corresponds to the server 25 illustrated in FIG. 1, and St corresponds to the storage 26 illustrated in FIG. 1. Although psw is not illustrated in FIG. 1, psw indicates a physical switch included in the physical resource illustrated in FIG. 1.

As indicated by reference sign B11, in the customer system 600 at time T, since vol03 is a node that does not exist, an event related to vol03 may not be displayed.

At time T+1 indicated by reference sign B2, each of nodes of VM02 and vol02 is deleted as indicated by reference sign B21, and each node of St003 in addition to VM03 and vol03 indicated by reference sign B22 is added.

As described above, in the related example illustrated in FIG. 3, in a case where the configuration information changes and a node is added between the time T and the time T+1, even when an event for the added node is notified, the event may not be displayed because there is no corresponding node at the time T.

Figure 4:
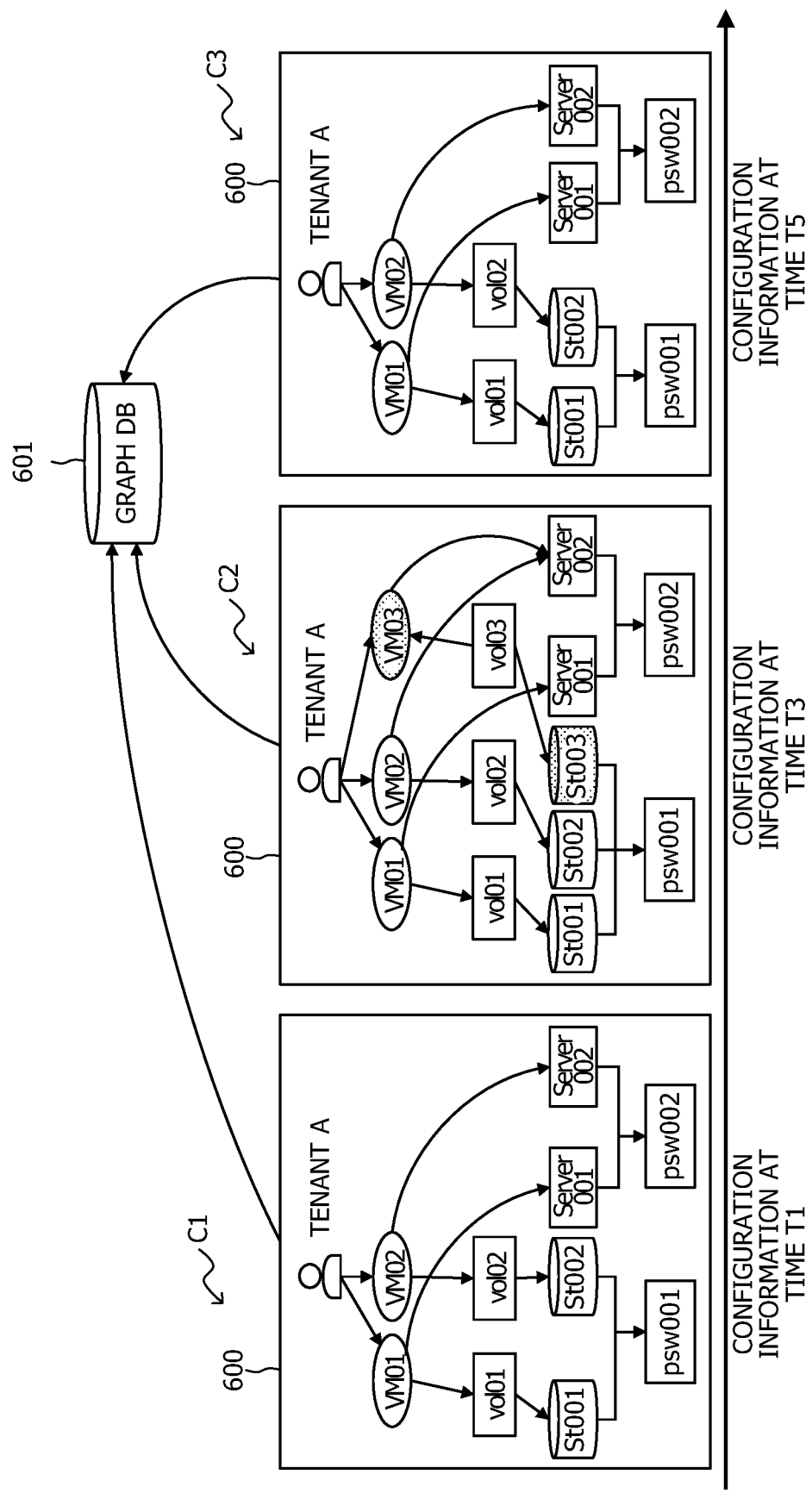
FIG. 4 is a diagram exemplifying storing processing of configuration information in a graph DB in the related example.

FIG. 4 is a diagram exemplifying storing processing of configuration information in a graph DB 601 in the related example.

At time T1 indicated by reference sign C1, the customer system 600 includes substantially the same nodes as those of the customer system 600 indicated by reference sign B1 in FIG. 3, and configuration information at the time point of the time T1 is stored in the graph DB 601. At time T3 indicated by reference sign C2, each of nodes of VM03, vol03, and St003 is added to the customer system 600, and configuration information at the time point of the time T3 is stored in the graph DB 601. At time T5 indicated by reference sign C3, each of nodes of VM03, vol03, and St003 is deleted in the customer system 600, and configuration information at the time point of the time T5 is stored in the graph DB 601.

As described above, in the related example illustrated in FIG. 4, the acquired configuration information of all the generations is stored in the graph DB 601, and nodes to be event targets are searched for from the configuration information of the plurality of generations in the graph DB 601 and combined. Generally, in the graph DB 601, the computation cost for searching for a node is high, and as a search space becomes larger, a search time becomes longer.

Figure 5:
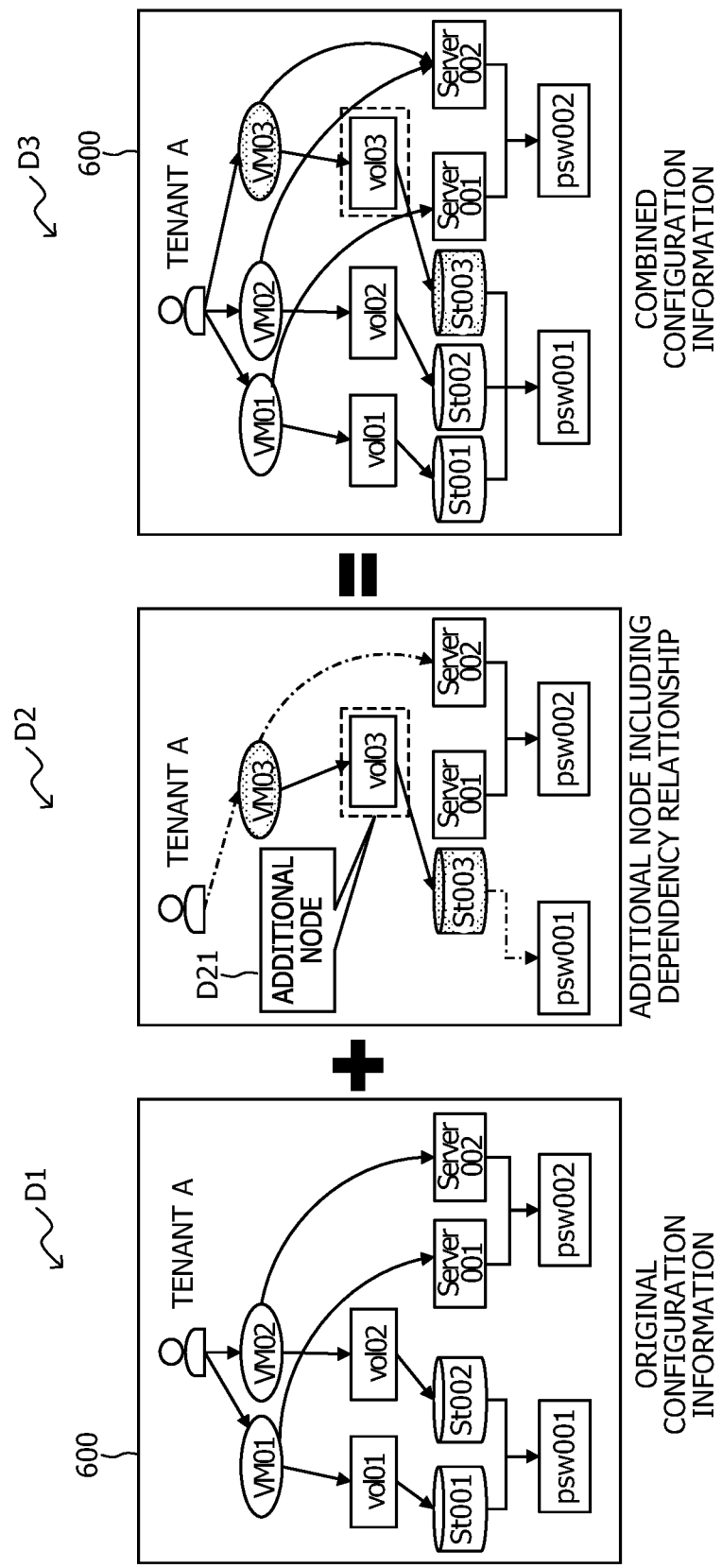
FIG. 5 is a diagram exemplifying combining processing of configuration information in the related example.

FIG. 5 is a diagram exemplifying combining processing of configuration information in the related example.

The customer system 600 indicated by reference sign D1 indicates original configuration information and includes substantially the same nodes as those of the customer system 600 indicated by reference sign B1 in FIG. 3.

For additional nodes that include dependency relationships indicated by reference sign D2, in addition to vol03 indicated by reference sign D21, VM03 and St003 are represented as additional nodes. For the additional nodes that include the dependency relationships indicated by reference sign D2, each node that indicates the dependency relationship with the added vol03, VM03, and St003 is also represented.

The customer system 600 indicated by reference sign D3 indicates combined configuration information, and the original configuration information indicated by reference sign D1 and the additional nodes that include the dependency relationships indicated by reference sign D2 are combined.

The configuration information expresses the dependency relationships as a directed graph. When a node that does not exist in configuration information of a certain generation is added, a dependency relationship may not be expressed by simply adding a node. Accordingly, as illustrated in FIG. 5, new configuration information is generated, including a dependency relationship of a node desired to be added.

Figure 6:
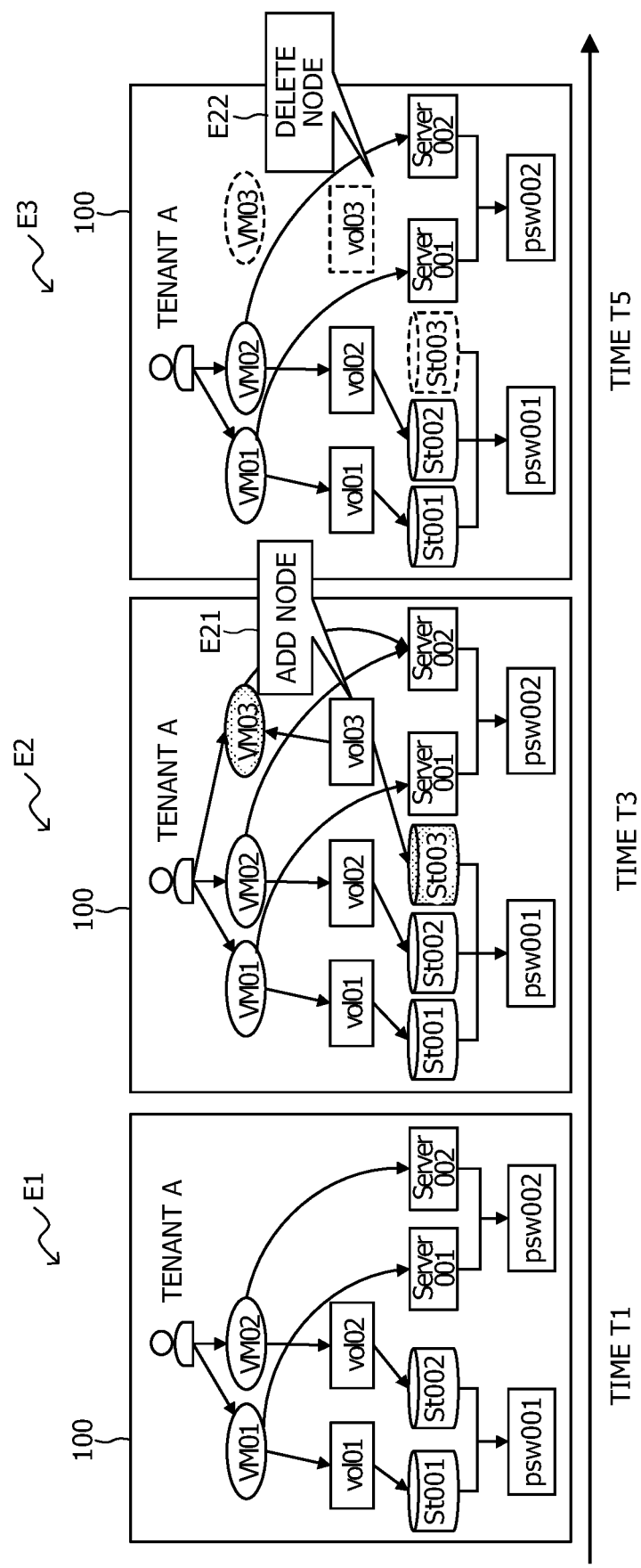
FIG. 6 is a diagram exemplifying changes in actual configuration information in the customer system illustrated in FIG. 1.

FIG. 6 is a diagram exemplifying changes in actual configuration information in the customer system 100 illustrated in FIG. 1.

At time T1 indicated by reference sign E1, the customer system 100 includes the tenant A, VM01, VM02, vol01, vol02, Server001, Server002, St001, St002, psw001, and psw002.

VM corresponds to the VM 23 illustrated in FIG. 1, vol corresponds to the virtual volume 24 illustrated in FIG. 1, Server corresponds to the server 25 illustrated in FIG. 1, and St corresponds to the storage 26 illustrated in FIG. 1. Although psw is not illustrated in FIG. 1, psw indicates a physical switch included in the physical resource illustrated in FIG. 1.

At time T3 indicated by reference sign E2, each of nodes of VM03 and St003 in addition to vol03 indicated by reference sign E21 is added.

At time T5 indicated by reference sign E3, each of nodes of vol03, VM03, and St003 is deleted as indicated by reference sign E22.

Figure 7:
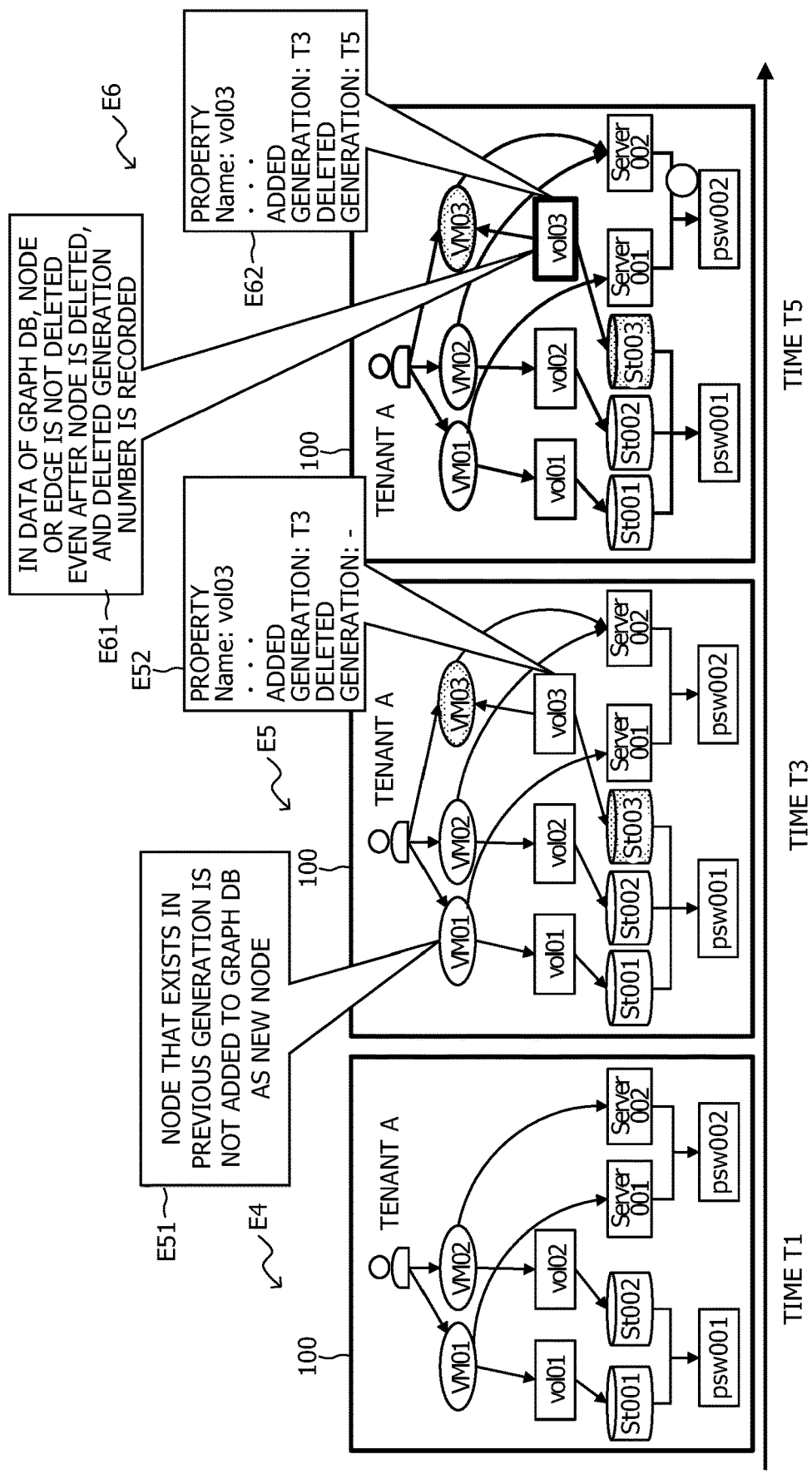
FIG. 7 is a diagram exemplifying changes in data in a graph DB corresponding to the changes in the actual configuration information illustrated in FIG. 6.

FIG. 7 is a diagram exemplifying changes in data in a graph DB corresponding to changes in the actual configuration information illustrated in FIG. 6.

At time T1 indicated by reference sign E4, the customer system 100 includes substantially the same nodes as those of the customer system 100 indicated by reference sign E1 in FIG. 6.

At time T3 indicated by reference sign E5, the customer system 100 includes substantially the same nodes as those of the customer system 100 indicated by reference sign E2 in FIG. 6. As indicated by reference sign E51, for example, since VM01 is a node that exists in the previous generation, it is not added to the graph DB as a new node. On the other hand, as indicated by reference sign E52, for example, for vol03, data such as "Name: vol03", "added generation: T3", and "deleted generation: – (none)" is stored in the graph DB as properties.

At time T5 indicated by reference sign E6, the customer system 100 includes substantially the same nodes as those of the customer system 100 indicated by reference sign E3 in FIG. 6. As indicated by reference sign E61, in the data of the graph DB, a node or an edge is not deleted even after the node is deleted, and a deleted generation number is recorded. For example, as indicated by reference sign E62, for vol03, in addition to data such as "Name: vol03" and "added generation: T3", data of "deleted generation: T5" is stored in the graph DB as properties.

As described above, in one example of the embodiment, the added generation and the deleted generation are recorded in the properties of the node or the edge stored in the graph DB. When a resource is added, a node or an edge is added to the graph DB, and an added generation is set in the property. On the other hand, when a resource is deleted, the deleted generation is set in the property without deleting a node or an edge in the graph DB.

Nodes that exist at designated time t and an edge between nodes may be selected, and configuration information at the time may be acquired. The configuration information at the time t may be acquired by selecting a node and an edge for which "added generation≤t" and "t<deleted generation" are satisfied.

By using the property, all the generations do not have to be stored in the graph DB, and thus the number of nodes or edges stored in the graph DB may be reduced.

Figure 8:
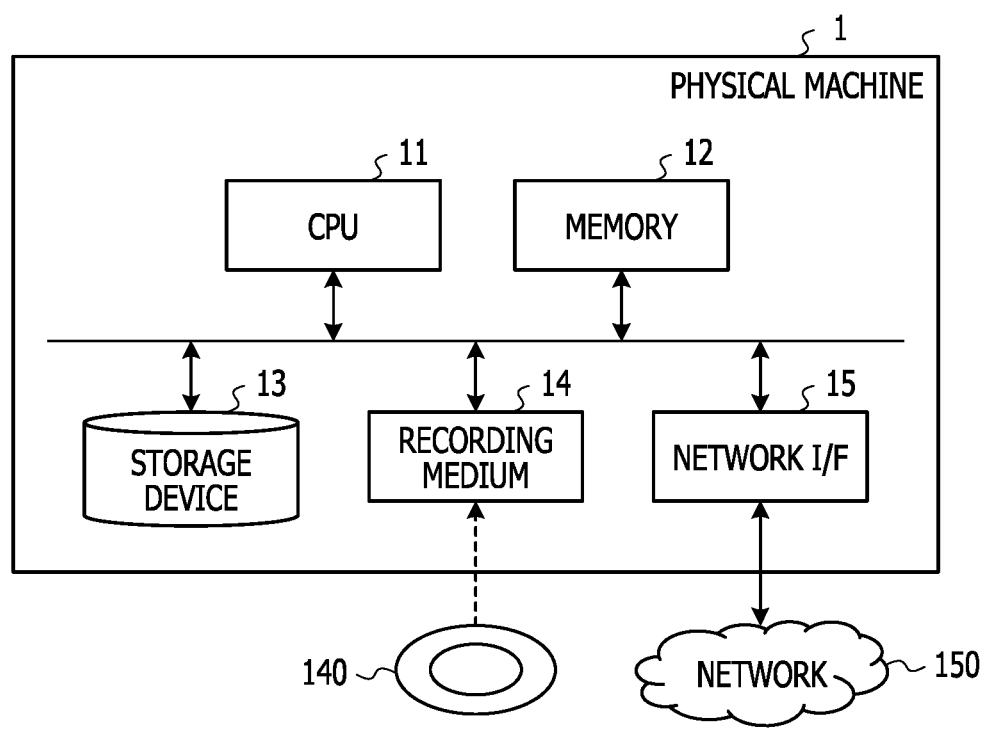
FIG. 8 is a block diagram schematically illustrating a hardware structure example of a physical machine in the customer system illustrated in FIG. 1.

FIG. 8 is a block diagram schematically illustrating a hardware structure example of a physical machine 1 in the customer system 100 illustrated in FIG. 1.

The physical machine 1 is an example of an information processing apparatus and includes a central processing unit (CPU) 11, a memory 12, a storage device 13, a recording medium IF 14, and a network interface (IF) 15.

The memory 12 is, for example, a storage device that includes a read-only memory (ROM) and a random-access memory (RAM). The RAM may be, for example, a dynamic RAM (DRAM). A program such as Basic Input/Output System (BIOS) may be written in the ROM of the memory 12. The software program in the memory 12 may be loaded and executed by the CPU 11 as appropriate. The RAM of the memory 12 may be used as a primary recording memory or a working memory.

The storage device 13 is, for example, a device that stores data in a readable and writable manner, and a hard disk drive (HDD), a solid-state drive (SSD), or a storage class memory (SCM) may be used, for example.

The recording medium IF 14 is configured so that a recording medium 140 is attachable. The recording medium IF 14 is configured to be able to read information recorded in the recording medium 140 in a state in which the recording medium 140 is attached to the recording medium IF 14. In this example, the recording medium 140 is portable. The recording medium 140 is a computer-readable recording medium, such as, for example, a flexible disk, a compact disc (CD) (such as a CD-ROM, a CD-R, or a CD-RW), a Digital Versatile Disc (DVD) (such as a DVD-ROM, a DVD-RAM, a DVD-R, a DVD+R, a DVD-RW, a DVD+RW, or an HD DVD), a Blu-ray disc, a magnetic disk, an optical disc, a magneto-optical disk, or a semiconductor memory.

The network IF 15 is an interface device for connecting the physical machine 1 to a network 150 and communicating with each node or the like of the customer system 100 illustrated in FIG. 1 via this network 150. As the network IF 15, for example, various interface cards corresponding to the standard of the network 150 such as wired local area network (LAN), wireless LAN, and wireless wide area network (WWAN) may be used.

The CPU 11 is, for example, a processing device that performs various controls and computations, and realizes various functions by executing an operating system (OS) or a program stored in the memory 12.

The program for realizing the functions as the CPU 11 may be provided in a form in which the program is recorded in a computer-readable recording medium such as, for example, a flexible disk, a CD (such as a CD-ROM, a CD-R, or a CD-RW), a DVD (such as a DVD-ROM, a DVD-RAM, a DVD-R, a DVD+R, a DVD-RW, a DVD+RW, or an HD DVD), a Blu-ray disc, a magnetic disk, an optical disc, or a magneto-optical disk. The computer (the CPU 11 in the present embodiment) may read the program from the above-described recording medium via a reading device (not illustrated), transfer and store the read program to an internal recording device or an external recording device, and use the program. The program may be recorded in a storage device (recording medium) such as, for example, a magnetic disk, an optical disk, or a magneto-optical disk and provided from the storage device to the computer via a communication path.

When the functions as the CPU 11 are realized, the program stored in the internal storage device (the memory 12 in the present embodiment) may be executed by the computer (the CPU 11 in the present embodiment). The computer may read and execute the program recorded in the recording medium.

Figure 9:
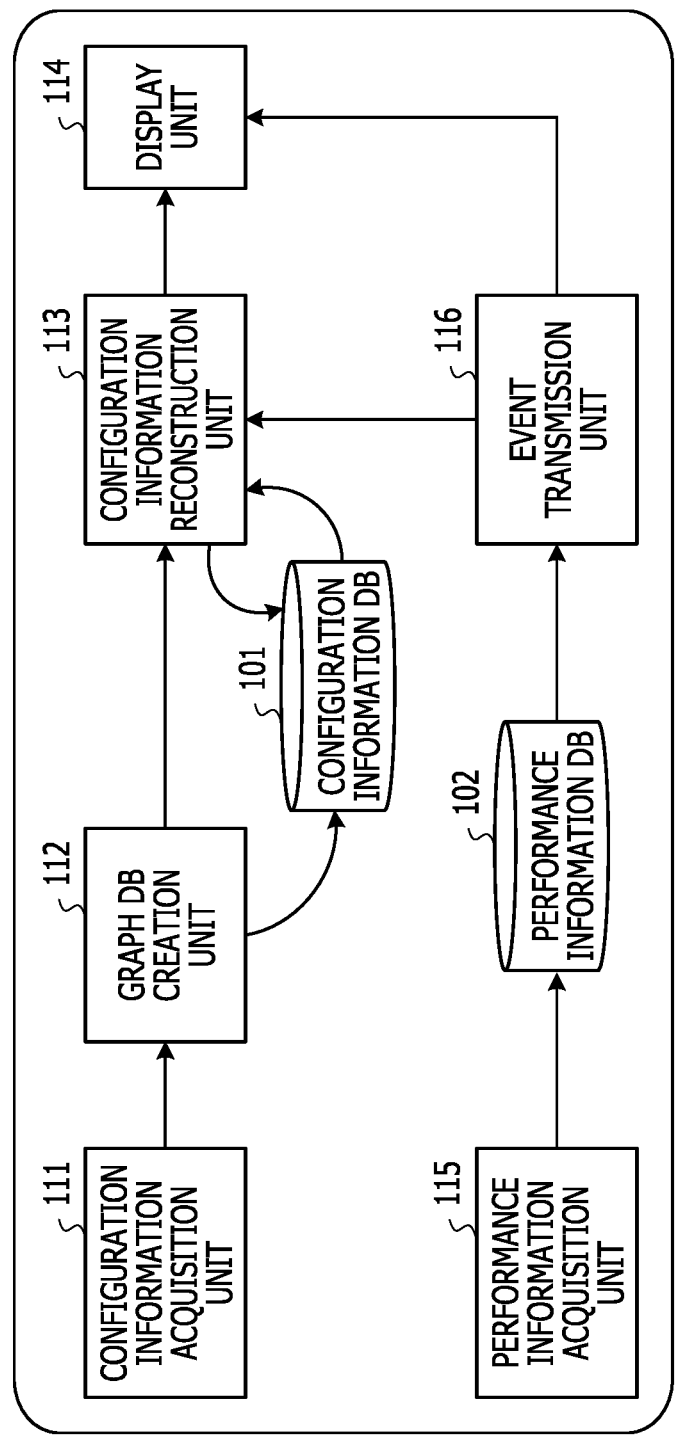
FIG. 9 is a block diagram schematically illustrating a software structure example of the physical machine illustrated in FIG. 8.

FIG. 9 is a block diagram schematically illustrating a software structure example of the physical machine 1 illustrated in FIG. 8.

The CPU 11 illustrated in FIG. 8 functions as a configuration information acquisition unit 111, a graph DB creation unit 112, a configuration information reconstruction unit 113, a display unit 114, a performance information acquisition unit 115, and an event transmission unit 116. The storage device 13 illustrated in FIG. 8 stores a configuration information DB 101 and a performance information DB 102.

The configuration information acquisition unit 111 detects addition of a node or an edge in the customer system 100, and outputs configuration information on the added node or edge to the graph DB creation unit 112.

Based on the configuration information received from the configuration information acquisition unit 111, the graph DB creation unit 112 creates a graph DB of the customer system 100 as illustrated in FIG. 6. The graph DB creation unit 112 stores the received configuration information in the configuration information DB 101.

The graph DB creation unit 112 records the added generation or deleted generation at the time of configuration change in property information in the directed graph. Among a plurality of nodes, the graph DB creation unit 112 selects nodes that exist at the designated time and edges between the nodes. By acquiring the configuration information of the nodes and the edges at the designated time, the graph DB creation unit 112 presents the directed graph.

The graph DB creation unit 112 may refer to the configuration information at the designated time for all of a plurality of nodes and a plurality of edges between the plurality of nodes in the directed graph, and record a deleted generation for a node or an edge that is not included in the configuration information. The graph DB creation unit 112 may refer to configuration information at the designated time for a plurality of nodes for which timestamps are less than the designated time and a plurality of edges between the plurality of nodes in the directed graph, and record a deleted generation for a node or an edge that is not included in the configuration information.

Based on the graph DB created by the graph DB creation unit 112 and the configuration information stored in the configuration information DB 101, the configuration information reconstruction unit 113 reconstructs the configuration information and recreates the graph DB. The configuration information reconstruction unit 113 may reconstruct the configuration information in response to transmission of an event from the event transmission unit 116.

When an event relating to any of a plurality of nodes and a plurality of edges between the plurality of nodes in the directed graph is detected at the designated time, the configuration information reconstruction unit 113 may reconstruct the configuration information. For the reconstruction of the configuration information, among the plurality of nodes and the plurality of edges, a node and an edge for which the designated time is after the added generation and for which the deleted generation is not recorded and a node and an edge for which the designated time is after the added generation and before the deleted generation may be presented in the directed graph.

The display unit 114 causes the graph DB recreated by the configuration information reconstruction unit 113 and the event output from the event transmission unit 116 to be displayed on a display device (not illustrated) in the physical machine 1.

The performance information acquisition unit 115 detects a change in performance information related to a node or an edge in the customer system 100, acquires the performance information related to the node or the edge, and stores the performance information in the performance information DB 102.

The event transmission unit 116 detects a change in performance information stored in the performance information DB 102, and transmits the detected change in the performance information as an event to the configuration information reconstruction unit 113 and the display unit 114.

FIG. 10 is a table exemplifying tenant configuration information in the configuration information DB 101 illustrated in FIG. 9.

The tenant configuration information is configuration information of the tenant 21 illustrated in FIG. 1. In a definition example indicated by reference sign F1, the tenant configuration information includes "TenantId", "tenant name", "added generation", and "deleted generation" as property names. The type of "TenantId" and "tenant name" is String (character string), and the type of "added generation" and "deleted generation" is Time (time).

In a data example indicated by reference sign F2, the tenant configuration information is "TenantId: 01", "tenant name: TenantA", "added generation: T1", and "deleted generation: – (none)".

FIG. 11 is a table exemplifying VM configuration information in the configuration information DB 101 illustrated in FIG. 9.

The VM configuration information is configuration information of the VM 23 illustrated in FIG. 1. In a definition example indicated by reference sign G1, the tenant configuration information includes "VMId", "VM name", "state", "port", "added generation", and "deleted generation" as property names. The type of "VMId", "VM name", "state", and "port" is String, and the type of "added generation" and "deleted generation" is Time.

In a data example indicated by reference sign G2, the tenant configuration information with "VMId: 01", for example, is "VM name: VM01", "state: active", "port: port1", "added generation: T1", and "deleted generation: – (none)". The tenant configuration information with "VMId: 03", for example, is "VM name: VM03", "state: active", "port: port2", "added generation: T3", and "deleted generation: T5".

FIG. 12 is a table exemplifying volume configuration information in the configuration information DB 101 illustrated in FIG. 9.

The volume configuration information is configuration information of the virtual volume 24 illustrated in FIG. 1. In a definition example indicated by reference sign H1, the volume configuration information includes "VolumeId", "volume name", "state", "added generation", and "deleted generation" as property names. The type of "VolumeId", "volume name", and "state" is String, and the type of "added generation" and "deleted generation" is Time.

In a data example indicated by reference sign H2, the tenant configuration information with "VolumeId:01", for example, is "volume name: Vol01", "state: active", "added generation: T1", and "deleted generation: – (none)". The tenant configuration information with "VolumeId:03", for example, is "volume name: Vol03", "state: active", "added generation: T3", and "deleted generation: T5".

FIG. 13 is a table exemplifying storage configuration information in the configuration information DB 101 illustrated in FIG. 9.

The storage configuration information is configuration information of the storage 26 illustrated in FIG. 1. In a definition example indicated by reference sign I1, the storage configuration information includes "StorageNodeId", "storage node name", "state", "added generation", and "deleted generation" as property names. The type of "StorageNodeId", "storage node name", and "state" is String, and type of "added generation" and "deleted generation" is Time.

In a data example indicated by reference sign I2, the storage configuration information with "StorageId:01", for example, is "storage name: St001", "state: online", "added generation: T1", and "deleted generation: – (none)". The storage configuration information with "StorageId:03", for example, is "storage name: St003", "state: online", "added generation: T3", and "deleted generation: T5".

FIG. 14 is a table exemplifying server configuration information in the configuration information DB 101 illustrated in FIG. 9.

The server configuration information is configuration information of the server 25 illustrated in FIG. 1. In a definition example indicated by reference sign J1, the server configuration information includes "ServerId", "server name", "state", "added generation", and "deleted generation" as property names. The type of "ServerId", "server name", and "state" is String, and the type of "added generation" and "deleted generation" is Time.

In a data example indicated by reference sign J2, the server configuration information with "ServerId: 01", for example, is "server name: Server001", "state: active", "added generation: T1", and "deleted generation: – (none)".

FIG. 15 is a table exemplifying physical switch configuration information in the configuration information DB 101 illustrated in FIG. 9.

The physical switch configuration information is configuration information of a physical switch included in the physical resource illustrated in FIG. 1. In a definition example indicated by reference sign K1, the physical switch configuration information includes "PSwitchId", "physical switch name", "added generation", and "deleted generation" as property names. The type of "PSwitchId" and "physical switch name" is String, and the type of "added generation" and "deleted generation" is Time.

In a data example indicated by reference sign K2, the physical switch configuration information with "PSwitchId: 01", for example, is "physical switch name: psw001", "added generation: T1", and "deleted generation: – (none)".

FIG. 16 is a table exemplifying edge configuration information in the configuration information DB 101 illustrated in FIG. 9.

The edge configuration information is configuration information of an edge between the nodes illustrated in FIG. 1. In a definition example indicated by reference sign L1, the edge configuration information includes "EdgeId", "Type", "Src", "Dst", "added generation", and "deleted generation" as property names. The type of "EdgeId", "Type", "Src", and "Dst" is String, and the type of "added generation" and "deleted generation" is Time.

In a data example indicated by reference sign L2, the physical switch configuration information with "EdgeId: 01", for example, is "Type: OwnedBy", "Src: VM01", "Dst: TenantA", "added generation: T1", and "deleted generation: – (none)". The physical switch configuration information with "EdgeId: 12", for example, is "Type: OwnedBy", "Src: VM03", "Dst: TenantA", "added generation: T3", and "deleted generation: T5".

[A-2] Operation Example

Figure 17:
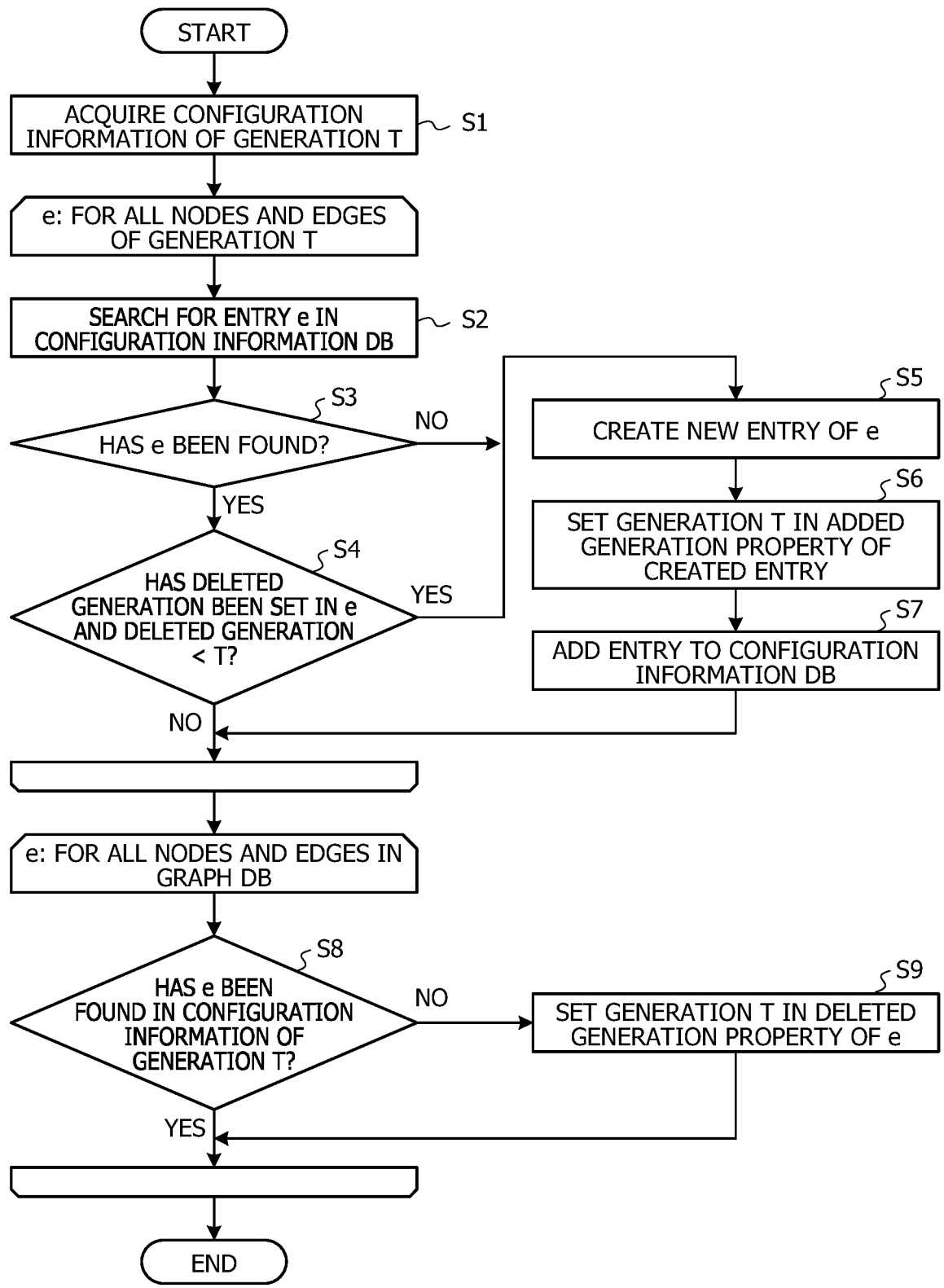
FIG. 17 is a flowchart describing a first example of graph DB creation processing in the physical machine illustrated in FIG. 8.

A first example of graph DB creation processing in the physical machine 1 illustrated in FIG. 8 in one example of the embodiment will be described in accordance with a flowchart (steps S1 to S9) illustrated in FIG. 17.

The configuration information acquisition unit 111 acquires configuration information of the generation T (step S1).

The graph DB creation unit 112 searches for an entry e in the configuration information DB 101 (step S2).

The graph DB creation unit 112 determines whether or not the entry e has been found (step S3).

When the entry e has not been found (refer to No route in step S3), the processing proceeds to step S5.

On the other hand, when the entry e has been found (refer to Yes route in step S3), the graph DB creation unit 112 determines whether or not the deleted generation has been set in the entry e and "deleted generation <T" is satisfied (step S4).

When the deleted generation has been set in the entry e and "deleted generation <T" is satisfied (refer to Yes route in step S4), the graph DB creation unit 112 creates a new entry of e (step S5).

The graph DB creation unit 112 sets the generation T in an added generation property of the created entry (step S6).

The graph DB creation unit 112 adds the entry to the configuration information DB 101 (step S7). For all the nodes and edges of the generation T, the processing in steps S2 to S7 is repeated.

When the deleted generation has not been set in the entry e or "deleted generation <T" is not satisfied in step S4 (refer to No route in step S4), the processing in steps S2 to S7 is repeated for all the nodes and edges of the generation T.

When the processing in steps S2 to S7 is completed for all the nodes and edges of the generation T, the graph DB creation unit 112 determines whether the entry e has been found in the configuration information of the generation T (step S8).

When the entry e has been found in the configuration information of the generation T (refer to Yes route in step S8), the processing in steps S8 and S9 is repeated for all the nodes and edges in the graph DB.

On the other hand, when the entry e has not been found in the configuration information of the generation T (refer to No route in step S8), the graph DB creation unit 112 sets the generation T in the deleted generation property of the entry e (step S9). For all the nodes and edges in the graph DB, the processing in steps S8 and S9 is repeated.

When the processing in steps S8 and S9 is completed for all the nodes and edges in the graph DB, the graph DB creation processing ends.

Figure 18:
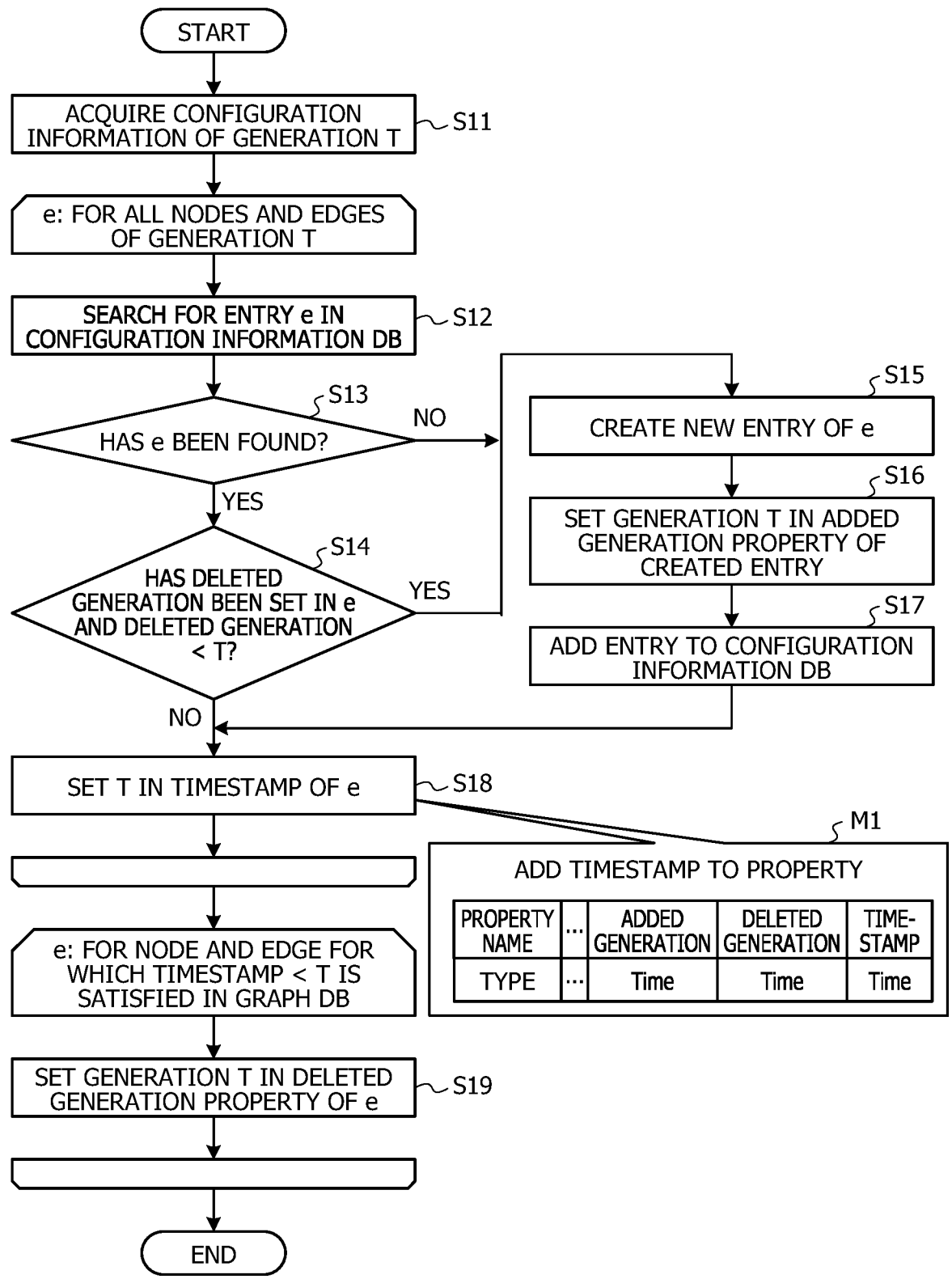
FIG. 18 is a flowchart describing a second example of the graph DB creation processing in the physical machine illustrated in FIG. 8.

Next, a second example of the graph DB creation processing in the physical machine 1 illustrated in FIG. 8 in the one example of the embodiment will be described below in accordance with a flowchart (steps S11 to S19) illustrated in FIG. 18.

The configuration information acquisition unit 111 acquires configuration information of the generation T (step S11).

The graph DB creation unit 112 searches for an entry e in the configuration information DB 101 (step S12).

The graph DB creation unit 112 determines whether or not the entry e has been found (step S13).

When the entry e has not been found (refer to No route in step S13), the processing proceeds to step S15.

On the other hand, when the entry e has been found (refer to Yes route in step S13), the graph DB creation unit 112 determines whether or not the deleted generation has been set in the entry e and "deleted generation <T" is satisfied (step S14).

When the deleted generation has been set in the entry e and "deleted generation <T" is satisfied (refer to Yes route in step S14), the graph DB creation unit 112 creates a new entry of e (step S15).

The graph DB creation unit 112 sets the generation T in the added generation property of the created entry (step S16).

The graph DB creation unit 112 adds the entry to the configuration information DB 101 (step S17). The processing proceeds to step S18.

When the deleted generation has not been set in the entry e or "deleted generation <T" is not satisfied in step S14 (refer to No route in step S14), the graph DB creation unit 112 sets T in the timestamp of the entry e (step S18). For all the nodes and edges of the generation T, the processing in steps S12 to S18 is repeated.

As indicated by reference sign Ml, a timestamp whose type is Time is added to the timestamp of the configuration information of each node and edge illustrated in FIGS. 10 to 16.

When the processing in steps S12 to S18 is completed for all the nodes and edges of the generation T, the graph DB creation unit 112 sets the generation T in the deleted generation property of the entry e (step S19). For nodes and edges for which "timestamp <T" is satisfied in the graph DB, the processing in step S19 is repeated.

When the processing of step S19 is completed for the node and the edge for which "timestamp <T" is satisfied in the graph DB, the graph DB creation processing ends.

Next, configuration information reconstruction processing in the physical machine 1 illustrated in FIG. 8 in one example of the embodiment will be described in accordance with a flowchart (steps S21 to S27) illustrated in FIG. 19.

The configuration information reconstruction unit 113 receives an event and acquires an event time t and an event node n (step S21).

The configuration information reconstruction unit 113 sets a result set as an empty set (step S22).

The configuration information reconstruction unit 113 searches the configuration information DB 101 (step S23).

The configuration information reconstruction unit 113 determines whether or not the deletion time has been set in the configuration information DB 101 (step S24).

When the deletion time has not been set (refer to No route in step S24), the configuration information reconstruction unit 113 determines whether "addition time ≤t" is satisfied (step S25).

When "addition time ≤t" is satisfied (refer to Yes route in step S25), the processing proceeds to step S27.

On the other hand, when "addition time ≤t" is not satisfied (refer to No route in step S25), the processing in steps S24 to S27 is repeated for the nodes and edges for which "addition time <t" is satisfied.

When the deletion time has been set in step S24 (refer to Yes route in step S24), the configuration information reconstruction unit 113 determines whether "addition time ≤t<deletion time" is satisfied (step S26).

When "addition time ≤t<deletion time" is not satisfied (refer to No route in step S26), the processing in steps S24 to S27 is repeated for the nodes and edges for which "addition time <t" is satisfied.

On the other hand, when "addition time ≤t<deletion time" is satisfied (refer to Yes route in step S26), the configuration information reconstruction unit 113 records the entry e in the result set (step S27). For the nodes and edges for which "addition time <t" is satisfied, the processing in steps S24 to S27 is repeated.

When the processing in steps S24 to S27 is completed for the nodes and edges for which "addition time <t" is satisfied, the configuration information reconstruction processing ends.

[B] Effects

According to the information processing apparatus, the program, and the information processing method in one example of the embodiment described above, for example, the following operation effects may be provided.

The graph DB creation unit 112 records an added generation or a deleted generation at the time of configuration change in property information in the directed graph. Among a plurality of nodes, the graph DB creation unit 112 selects nodes that exist at designated time and an edge between the nodes. By acquiring configuration information of the nodes and the edges at the designated time, the graph DB creation unit 112 presents the directed graph.

Accordingly, it is possible to shorten a time for searching for configuration information of a cloud infrastructure and update the configuration information in a short cycle. For example, since the time for searching the graph DB may be shortened by reducing the number of nodes and edges stored in the graph DB, the configuration information may be updated in a short cycle in accordance with a failure event based on the performance information. There is no mismatch, for example, the node of the performance information does not exist.

The graph DB creation unit 112 may refer to the configuration information at the designated time for all of the plurality of nodes and a plurality of edges between the plurality of nodes in the directed graph, and record the deleted generation for a node or an edge that is not included in the configuration information. Accordingly, it is possible to reliably delete a node or an edge from the graph DB.

The graph DB creation unit 112 may refer to the configuration information at the designated time for the plurality of nodes for which timestamps are less than the designated time and a plurality of edges between the plurality of nodes in the directed graph, and record the deleted generation for a node or an edge that is not included in the configuration information. Accordingly, by adding a timestamp to a property, the number of entries to be searched may be reduced and the time taken to create the graph DB may be further reduced.

When an event that relates to any of the plurality of nodes and a plurality of edges between the plurality of nodes in the directed graph is detected at the designated time, the configuration information reconstruction unit 113 may reconstruct the configuration information. For the reconstruction of the configuration information, among the plurality of nodes and the plurality of edges, a node and an edge for which the designated time is after the added generation and for which the deleted generation is not recorded, and a node and an edge for which the designated time is after the added generation and before the deleted generation may be presented in the directed graph. Accordingly, it is possible to reliably reconstruct the configuration information in response to occurrence of an event such as a change in performance of a node or an edge.

[C] Others

The disclosed technique is not limited to the above-described embodiment. The disclosed technique may be carried out by variously modifying the technique without departing from the gist of the present embodiment. Each of the configurations and each of the processing of the present embodiment may be selectively employed or omitted as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes executed by a processor included in a computer that presents a directed graph representing a dependency relationship between a plurality of nodes to execute a process, the process comprising:
   recording an added generation or a deleted generation at a time of configuration change in property information in the directed graph;
   selecting, among the plurality of nodes, nodes that exist at designated time and an edge between the nodes; and
   presenting the directed graph by acquiring configuration information of the nodes and the edge at the designated time, wherein
   the presenting of the directed graph includes presenting, when an event that relates to any of the plurality of nodes and a plurality of edges between the plurality of nodes in the directed graph is detected at the designated time, among the plurality of nodes and the plurality of edges, a node and an edge for which the designated time is after the added generation and for which the deleted generation is not recorded, and a node and an edge for which the designated time is after the added generation and before the deleted generation, in the directed graph.

2. The non-transitory computer-readable recording medium according to claim 1,
   wherein the recording includes recording the deleted generation for a node included in the plurality of nodes or an edge, which is not included in the configuration information by referring to the configuration information at the designated time for all of the plurality of nodes and a plurality of edges included in edge between the plurality of nodes in the directed graph.

3. The non-transitory computer-readable recording medium according to claim 1, wherein the process further comprising:
   the recording includes recording the deleted generation for a node or an edge that is not included in the configuration information by referring to the configuration information at the designated time for the plurality of nodes for which timestamps are less than the designated time and a plurality of edges between the plurality of nodes in the directed graph.

4. An information processing apparatus that presents a directed graph representing a dependency relationship between a plurality of nodes, the information processing apparatus comprising:
   a memory; and
   a processor coupled to the memory and configured to:
   control to record an added generation or a deleted generation at a time of configuration change in property information in the directed graph,
   select, among the plurality of nodes, nodes that exist at designated time and an edge between the nodes, and
   present the directed graph by acquiring configuration information of the nodes and the edge at the designated time, wherein
   the presenting of the directed graph includes presenting, when an event that relates to any of the plurality of nodes and a plurality of edges between the plurality of nodes in the directed graph is detected at the designated time, among the plurality of nodes and the plurality of edges, a node and an edge for which the designated time is after the added generation and for which the deleted generation is not recorded, and a node and an edge for which the designated time is after the added generation and before the deleted generation, in the directed graph.

5. An information processing method performing by an information processing apparatus that presents a directed graph representing a dependency relationship between a plurality of nodes, the information processing method comprising:
   recording an added generation or a deleted generation at a time of configuration change in property information in the directed graph;
   selecting, among the plurality of nodes, nodes that exist at designated time and an edge between the nodes; and
   presenting the directed graph by acquiring configuration information of the nodes and the edge at the designated time, wherein
   the presenting of the directed graph includes presenting, when an event that relates to any of the plurality of nodes and a plurality of edges between the plurality of nodes in the directed graph is detected at the designated time, among the plurality of nodes and the plurality of edges, a node and an edge for which the designated time is after the added generation and for which the deleted generation is not recorded, and a node and an edge for which the designated time is after the added generation and before the deleted generation, in the directed graph.

* * * * *